F. TUNNICLIFF.
POURING SPOUT.
APPLICATION FILED NOV. 15, 1921.
1,416,309. Patented May 16, 1922.
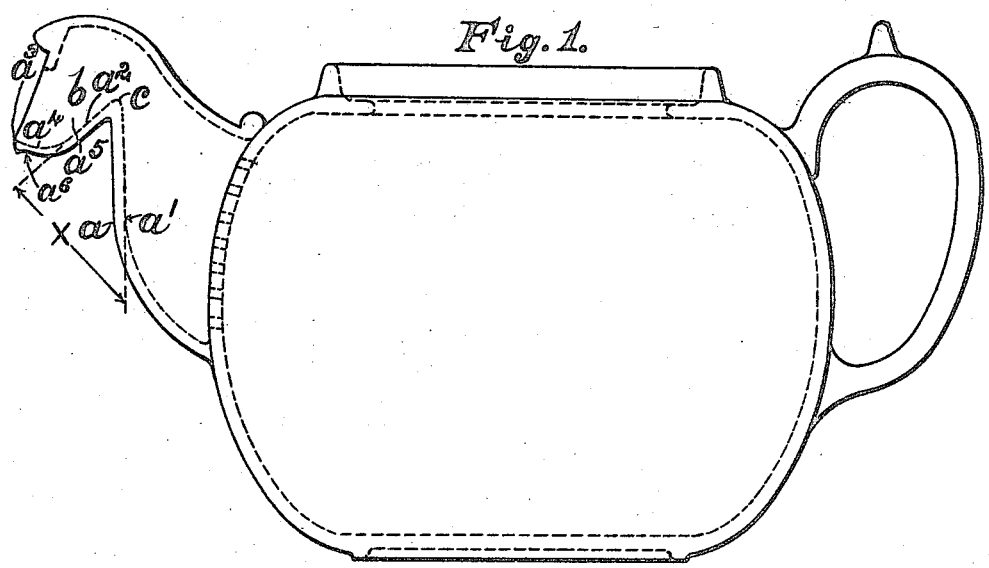
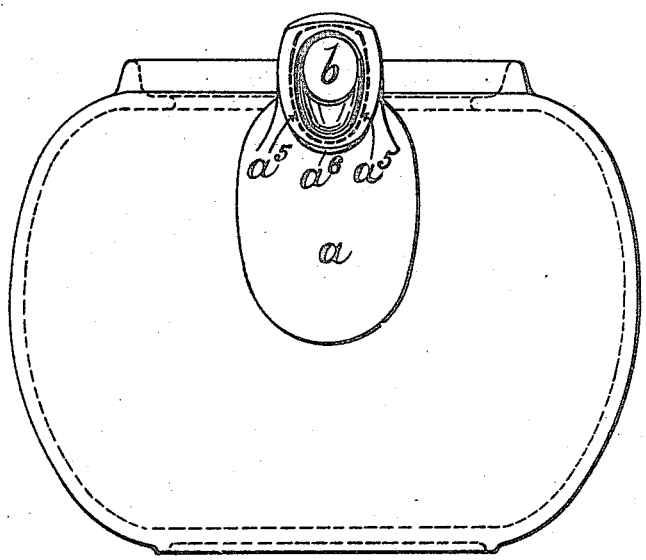
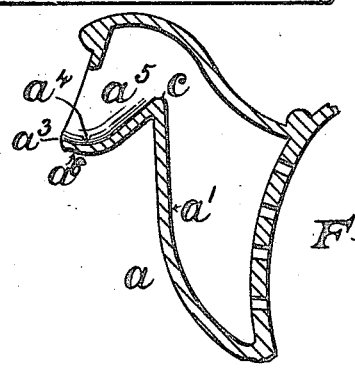
Inventor
Frank Tunnicliff
by Herbert W. Pfenner
Attorney.

UNITED STATES PATENT OFFICE.

FRANK TUNNICLIFF, OF BURSLEM, STOKE-ON-TRENT, ENGLAND.

POURING SPOUT.

1,416,309.　　　　　　　Specification of Letters Patent.　　Patented May 16, 1922.

Application filed November 15, 1921. Serial No. 515,278.

*To all whom it may concern:*

Be it known that I, FRANK TUNNICLIFF, subject of the King of Great Britain and Ireland, and resident of Burslem, Stoke-on-Trent, in the county of Stafford, England, potter, have invented certain new and useful Improvements in Pouring Spouts, of which the following is a specification.

My invention relates to improvements in the spouts of teapots, coffee pots, and the like pouring vessels, the object being to provide improvements at or near the outlet end of such spouts to prevent any drip of liquid therefrom during the action of pouring and also whilst the teapot is being moved to the horizontal position after pouring has taken place.

My invention will be fully described with reference to the accompanying drawings, in which Fig. 1 is a side elevation of a teapot constructed with my improved spout, the lid of the teapot having been removed, Fig. 2 is a front elevation of same, and Fig. 3 is a sectional elevation to clearly illustrate the spout.

In carrying out my said invention the inner face $a^1$ of the breast $a$ of the spout forms an acute angle X with the inclined face $a^2$ at the back of the lip $a^3$, the apex $c$ of the angle being slightly rounded and higher than the lip $a^3$ of the spout, the said apex $c$ forming a sharp cut off of the liquid immediately pouring has been accomplished. The lower portion of the pouring aperture $b$ is slightly concave or recessed at $a^4$ and the side cheeks $a^5$ are swollen a little more on their inner side than they are at the outlet end or near the lip of the spout. The swelling referred to is shown in dotted lines at Fig. 2 and is for the purpose of allowing the spread or distribution of the last drop of liquid flowing into the recess or concave base $a^4$ of the lip $a^3$ of the spout. The underside of the lip $a^3$ is provided with a slight depression or dimple $a^6$ to arrest and detain any atom of liquid if it should escape over the edge of the lip $a^3$.

By constructing the spout of teapots and other pouring vessels in the manner described the tea or other liquid can be poured therefrom into the cup in the ordinary way and when the pouring has been completed the flow of liquid is sharply cut off by the apex $c$ at the moment the pouring vessel is being moved back again to normal position, the liquid not having passed over the lip $a^3$ being retained in the shallow recess $a^4$ the swelled cheeks $a^5$ allowing transverse distribution thereof making it impossible for any drip from the spout to take place.

What I claim as my invention and desire to secure by Letters Patent is:—

1. In spouts for teapots, coffee pots and other pouring vessels, the combination with a sharp cut off formed by the apex or junction of the inner face of the breast of the spout and the inclined back face of the lip, of a shallow recess inside the lip of the spout and a slight depression or dimple on the underside thereof substantially as and for the purpose described.

2. In a spout for teapots, coffee pots and other vessels having the features claimed in claim 1, the use of swollen cheeks for the distribution or retention of the last drop of liquid after the pouring action has taken place substantially as described.

3. A pouring spout having an upwardly projecting cut off in its underside, and a pouring lip in front of the said cut off, said pouring lip having a forwardly and downwardly inclined back face and an upwardly and forwardly inclined tip which forms a shallow recess with the said back face.

In testimony whereof I have hereunto set my hand in the presence of two witnesses.

FRANK TUNNICLIFF.

Witnesses:
J. BENTON,
JOHN H. COPESTRAKE.